United States Patent
Chau (10) Patent No.: US 9,998,534 B2
(45) Date of Patent: Jun. 12, 2018

(54) PEER-TO-PEER SEED ASSURANCE PROTOCOL

(71) Applicant: INTERNATIONAL BUSINESS MACHINES CORPORATION, Armonk, NY (US)

(72) Inventor: Kwan Yin Andrew Chau, Parramatta (AU)

(73) Assignee: International Business Machines Corporation, Armonk, NY (US)

( * ) Notice: Subject to any disclaimer, the term of this patent is extended or adjusted under 35 U.S.C. 154(b) by 107 days.

(21) Appl. No.: 15/245,806

(22) Filed: Aug. 24, 2016

(65) Prior Publication Data

US 2018/0063232 A1    Mar. 1, 2018

(51) Int. Cl.
*G06F 15/16*    (2006.01)
*H04L 29/08*    (2006.01)

(52) U.S. Cl.
CPC ............ *H04L 67/108* (2013.01); *H04L 67/06* (2013.01); *H04L 67/1061* (2013.01); *H04L 67/1091* (2013.01)

(58) Field of Classification Search
CPC ... H04L 67/108; H04L 67/06; H04L 67/1061; H04L 67/1091
See application file for complete search history.

(56) References Cited

U.S. PATENT DOCUMENTS

| | | | |
|---|---|---|---|
| 9,288,010 B2* | 3/2016 | Luby | H04L 1/0056 |
| 2011/0010421 A1* | 1/2011 | Chavez | H04L 12/6418 709/204 |
| 2014/0164627 A1* | 6/2014 | Burba | H04L 67/1008 709/227 |
| 2014/0173024 A1 | 6/2014 | Burba et al. | |
| 2015/0088992 A1* | 3/2015 | Ioannidis | H04L 67/1063 709/204 |

* cited by examiner

*Primary Examiner* — Jonathan A Bui
(74) *Attorney, Agent, or Firm* — Tutunjian & Bitetto, P.C.; Scott S. Dobson (57) ABSTRACT

Computer-implemented methods and systems are provided for executing a peer-to-peer (P2P) protocol. The computer-implemented method may include determining a number of peers connected to the P2P file sharing network, determining a number of seeds connected to the P2P file sharing network and having a complete copy of a file, the file including a plurality of file parts, and sending a request to download the file. The computer-implemented method may further include, based on the request, computing a seed ratio and a comparison ratio for each of the plurality of file parts, and adjusting download/upload priority of each of the plurality of file parts when the seed ratio is less than a first predetermined threshold and the comparison ratio is less than a second predetermined threshold.

20 Claims, 8 Drawing Sheets

| | File | Seeds | Seed Ratio (SR) | Comparison | Comparison Ratio (CR) | Priority |
|---|---|---|---|---|---|---|
| 501 | file.part1.rar | 1/30 | 0.033 | 1/12 | 0.111 | MEDIUM |
| 502 | file.part2.rar | 3/30 | 0.1 | 2/12 | 0.222 | MEDIUM |
| 503 | file.part3.rar | 1/30 | 0.033 | 1/12 | 0.111 | MEDIUM |
| 504 | file.part4.rar | 2/30 | 0.066 | 2/12 | 0.222 | MEDIUM |
| 505 | file.part5.rar | 3/30 | 0.1 | 1/12 | 0.111 | MEDIUM |
| 506 | file.part6.rar | 2/30 | 0.066 | 2/12 | 0.166 | MEDIUM |
| | Total | 12 | | | 1 | |

# PEER-TO-PEER SEED ASSURANCE PROTOCOL

BACKGROUND

Technical Field

The present invention relates generally to data processing systems and methods, and more specifically, to file sharing in a segmented peer-to-peer file sharing network.

Description of the Related Art

Peer-to-peer (P2P) file sharing programs are designed to widely distribute large amounts of data, while minimizing costly server and bandwidth resources. P2P systems have recently been put to commercial use through partnerships with content providers, such as media and cable companies. P2P networks are gaining credibility as a means for legal revenue generating activity, thus creating a need for methods to rapidly optimize content delivery. A file is made available for P2P download by providing a link to file information, often stored on a hypertext transport protocol (HTTP), or Web server. The file information may also include the address of a tracker, which is a device in the P2P network that helps downloaders (peers) to find each other. Peers communicate with the host of the file information and the tracker using a simple protocol layered on top of HTTP. Each peer sends information about what file it is downloading, on what port it is listening, and other information. The tracker responds with a list of contact information for peers that are downloading the same file.

SUMMARY

In accordance with an embodiment of the present principles, a computer-implemented method executed on a peer-to-peer (P2P) file sharing network having at least one processor for executing a P2P protocol is provided. The computer-implemented method includes the steps of determining a number of peers connected to the P2P file sharing network, determining a number of seeds connected to the P2P file sharing network and having a complete copy of a file, the file including a plurality of file parts, and sending a request to download the file. The computer-implemented method further includes the steps of, based on the request, computing a seed ratio and a comparison ratio for each of the plurality of file parts, and adjusting download/upload priority of each of the plurality of file parts when the seed ratio is less than a first predetermined threshold and the comparison ratio is less than a second predetermined threshold.

In accordance with another embodiment of the present principles, a system for executing a P2P protocol is provided. The system includes a memory and a processor in communication with the memory, wherein the processor is configured to: determine a number of peers connected to the P2P file sharing network, determine a number of seeds connected to the P2P file sharing network and having a complete copy of a file, the file including a plurality of file parts, send a request to download the file, based on the request, compute a seed ratio and a comparison ratio for each of the plurality of file parts, and adjust download/upload priority of each of the plurality of file parts when the seed ratio is less than a first predetermined threshold and the comparison ratio is less than a second predetermined threshold.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

Throughout the drawings, same or similar reference numerals represent the same or similar elements.

DETAILED DESCRIPTION

The present principles are directed to systems and methods for applying a seed assurance protocol to parts or segments of a file requested to be downloaded by a peer in a P2P network.

The systems and methods provide for applying a seed assurance protocol for adjusting download/upload priority of file parts/segments in order to enhance sustainability of all the file parts/segments of the file. The systems and methods provide for promoting downloading/uploading of files that only a small ratio of users (peers) have completed based on meeting one or more thresholds. The first threshold relates to a seed ratio (SR) and the second threshold relates to a comparison ratio (CR).

The systems and methods further provide for giving priority to downloading files that have few seeds amongst all the peers and few seeds amongst other files to be downloaded. The systems and methods further provide for adjusting the download/upload priority of individual file parts in order to improve the sustainability of all the file parts as a whole. More specifically, the systems and methods check each part of the file for the adjustable values (X, Y) and increase the download and upload priority of the file part to HIGH/LOW/MEDIUM based on a seed assurance (SA) rule, where the seed assurance (SA) rule includes Seed Ratio ($SR \leq X$) and Comparison Ratio ($CR \leq Y$).

The term "peers" refers to any user connected to the P2P network, whether the user is still downloading a file (or parts of a file) or has finished downloading a file (or parts of a file).

The term "seeds" refers to the number of peers that have a complete copy of a file.

The term "seed ratio (SR)" refers to a ratio of seeds to the total peers accessing or downloading the file (or part of a file).

The term "comparison" refers to the number of seeds for the file versus the total number of seeds for all files.

The term "comparison ratio (CR)" refers to a ratio of seeds for the file to the total number of seeds for all files.

The seed assurance rule is satisfied when $SR \leq X$ and $CR \leq Y$, where "X" is a first predetermined threshold and "Y" is a second predetermined threshold. In one embodiment, the first predetermined threshold is different than the second predetermined threshold. In another embodiment, the first predetermined threshold is equal to the second predetermined threshold. In one example embodiment, the first predetermined threshold may be, e.g., 0.2 and the second predetermined threshold may be, e.g., 0.1. One skilled in the art may contemplate different predetermined thresholds.

Figure 1:
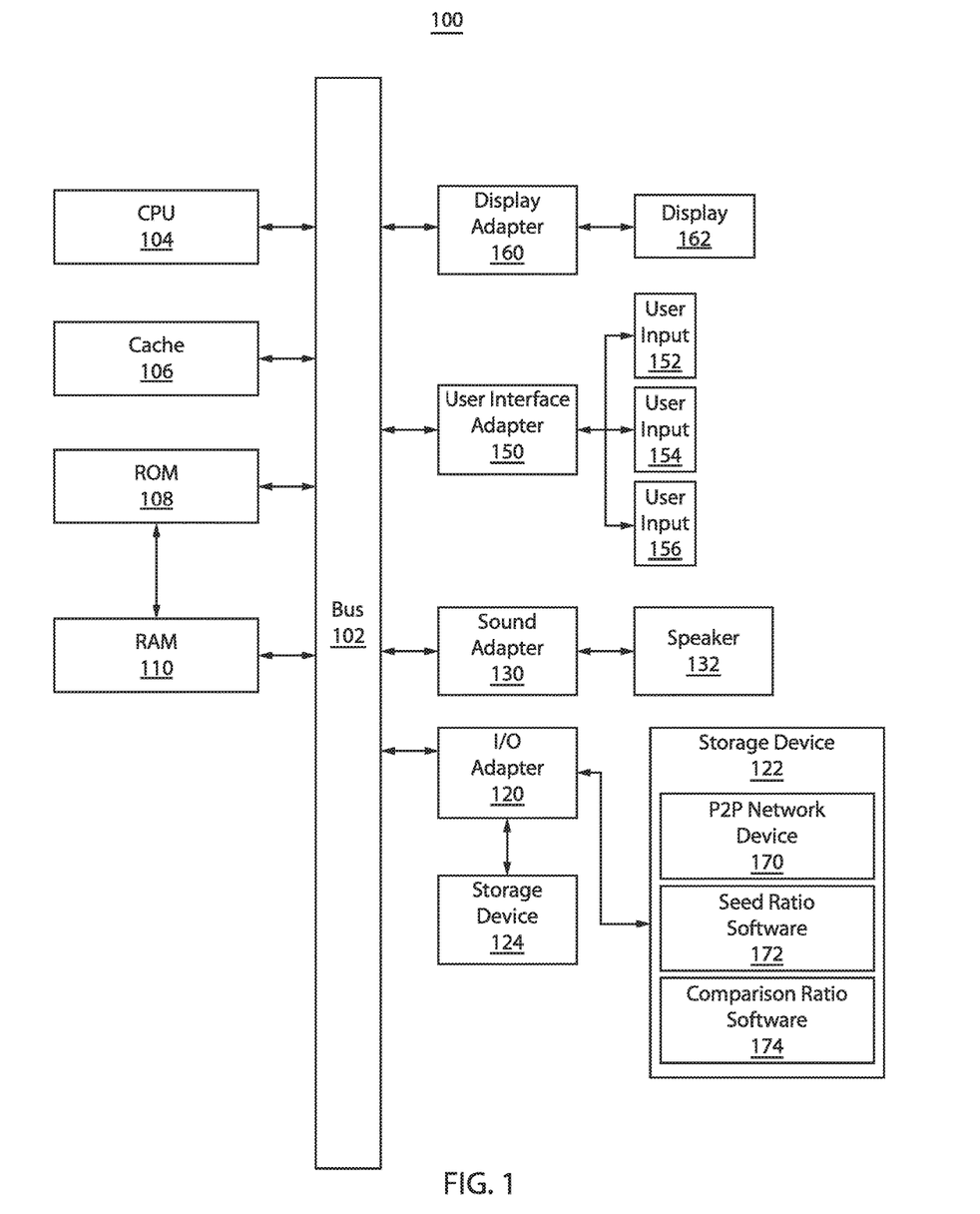
FIG. 1 is a block/flow diagram of an exemplary computing system for executing a peer-to-peer (P2P) protocol, in accordance with an embodiment of the present principles.

Referring now to the drawings in which like numerals represent the same or similar elements and initially to FIG. 1, a block/flow diagram of an exemplary computing system for executing a peer-to-peer (P2P) protocol is presented, in accordance with an embodiment of the present principles.

An exemplary P2P protocol processing system 100 to which the present principles may be applied is shown in accordance with one embodiment. The P2P protocol processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices. The I/O adapter 120 further communicates with a P2P network device 170, seed ratio software 172, and comparison ratio software device 174 for executing a P2P protocol. The P2P network device 170, the seed ratio software 172, and the comparison ratio software 174 may be associated with the storage device 122. Such devices 170, 172, 174 need not be incorporated within the storage device 122. Such devices 170, 172, 174 may be external to the storage device 122. One skilled in the art may contemplate different system and networking configurations for incorporating the devices 170, 172, 174 therein.

A speaker 132 is operatively coupled to system bus 102 by the sound adapter 130. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 may be the same type of user input device or different types of user input devices. The user input devices 152, 154, and 156 are used to input and output information to and from the P2P protocol processing system 100.

Of course, the P2P protocol processing system 100 may also include other elements (not shown), as readily contemplated by one of skill in the art, as well as omit certain elements. For example, various other input devices and/or output devices may be included in the P2P protocol processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the P2P protocol processing system 100 are readily contemplated by one of ordinary skill in the art given the teachings of the present principles provided herein.

Figure 2:
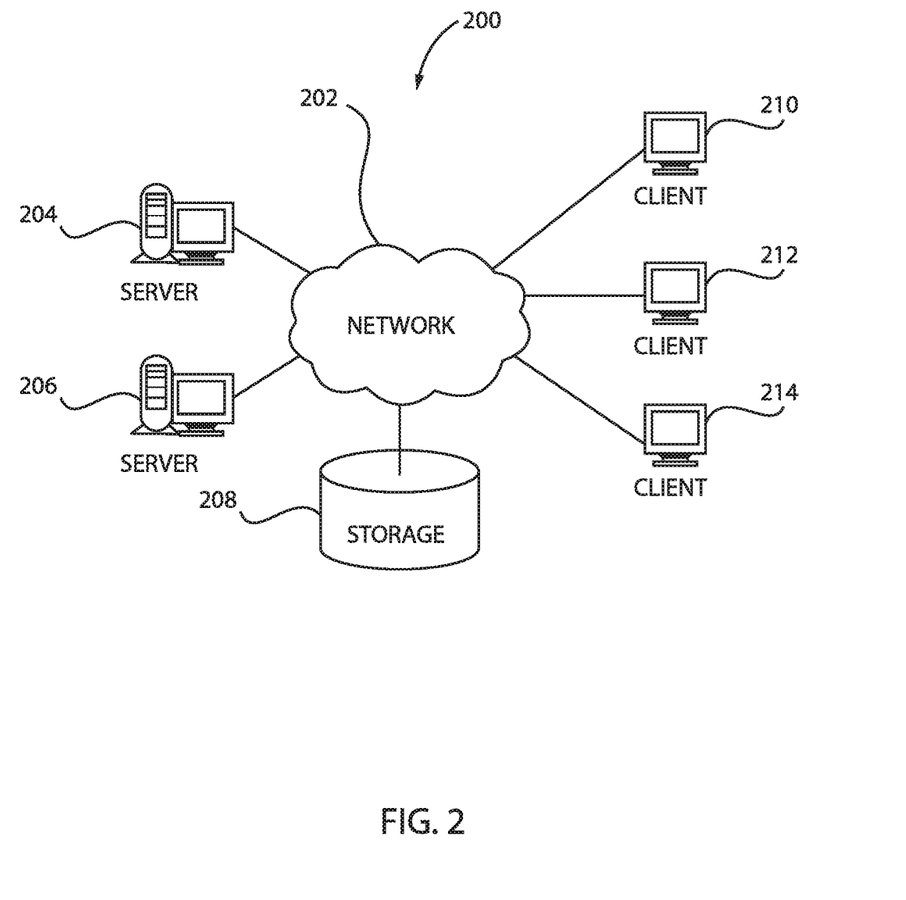
FIG. 2 is a block/flow diagram of an exemplary distributed data processing system for executing the P2P protocol, in accordance with an embodiment of the present principles.

FIG. 2 is a block/flow diagram of an exemplary distributed data processing system for executing the P2P protocol, in accordance with an embodiment of the present principles.

Distributed data processing system 200 may include a network of computers in which embodiments of the illustrative embodiments may be implemented. The distributed data processing system 200 contains at least one network 202, which is the medium used to provide communication links between various devices and computers connected together within distributed data processing system 200. The network 202 may include connections, such as wire, wireless communication links, or fiber optic cables.

In the depicted example, server 204 and server 206 are connected to network 202 along with storage unit 208. In addition, clients 210, 212, and 214 are also connected to network 202. These clients 210, 212, and 214 may be, for example, personal computers, network computers, or the like. In the depicted example, server 204 provides data, such as boot files, operating system images, and applications to the clients 210, 212, and 214. Clients 210, 212, and 214 are clients to server 204 in the depicted example. Distributed data processing system 200 may include additional servers, clients, and other devices not shown.

In one illustrative embodiment, server 204 may provide access to a Web page or other content that contains a link to file information for a given file. Server 206 may be a tracker for the file. Clients 210-214 may have peer-to-peer (P2P) file sharing clients that participate in downloading the given file.

More particularly, clients 210 and 212 may already be members of a swarm, each downloading file fragments from and uploading file fragments to peers in the swarm. A user at client 214 may click on the link, which results in the P2P client software downloading file information including, for example, file name, file length, hashing information, and an address of the tracker at server 206. The address of the tracker may be a uniform resource locator (URL), for instance.

The P2P client software at client 214 may then contact the tracker at server 206, which, in turn, responds with addresses of clients 210, 212. Client 214 then establishes communication with clients 210, 212, and begins downloading file fragments. As client 214 downloads file fragments, it reports the file fragments it has available for upload to the other peers in the swarm.

In the depicted example, distributed data processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 200 may also be implemented to include a number of different types of networks, such as for example, an intranet, a local area network (LAN), a wide area network (WAN), or the like. As stated above, FIG. 2 is intended as an example, not as an architectural limitation for different embodiments of the present invention, and therefore, the particular elements shown in FIG. 2 should not be considered limiting with regard to the environments in which the illustrative embodiments of the present invention may be implemented.

The efficiency of content distribution increases relative to the number of peers who are sharing that content. The peers are segmented in the file sharing network. Swarms may be formed around the retrieval of a particular file. If the number of peers sharing a file is too low, then the number of peers having a given file fragment may be low as well. As a result, a file client that has a rare file fragment available for upload may receive a high number of requests for that file fragment, and the bandwidth is not ideally distributed among the peers. Increasing the number of peers in a swarm helps to more evenly distribute the bandwidth costs.

Figure 3:
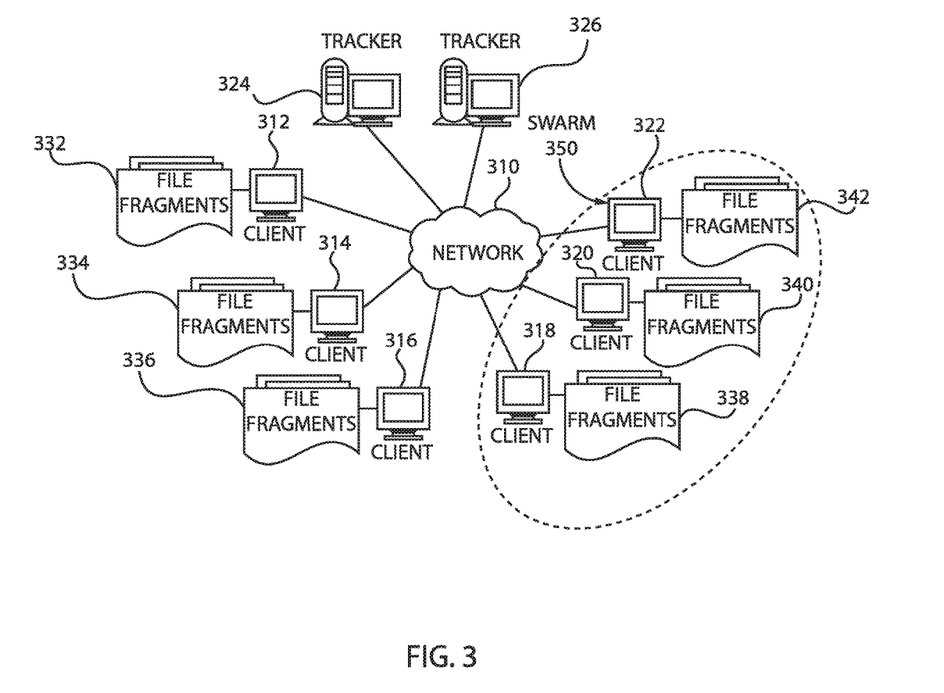
FIG. 3 is a block/flow diagram of an exemplary data processing system including file parts/fragments for executing the P2P protocol, in accordance with an embodiment of the present principles.

FIG. 3 is a block/flow diagram of an exemplary data processing system including file parts/fragments for executing the P2P protocol, in accordance with an embodiment of the present principles.

Clients 312-322 are connected to network 310. Trackers 324, 326 are responsible for helping clients 312-322 find each other to form segmented networks, or "swarms," of peers for downloading/uploading particular files. Clients 312-322 possess file fragments 332-342, respectively.

In the depicted example, clients 318, 320, 322 are part of swarm 350. Clients 312, 314, 316 may be participants of other swarms. In accordance with an illustrative embodiment, clients 312, 314, 316 may provide bandwidth and storage space for file sharing. That is, client 316, for instance, may take part in swarm 350 without a user at client 316 expressly requesting the file being distributed in swarm 350.

In one implementation, a file is made available for P2P download by providing a link to file information, often stored on a hypertext transport protocol (HTTP), or Web, server. The file information may include, for example, file name, file length, and hashing information. The file information may also include the address of a tracker, which is a device in the P2P network that helps downloaders (peers) to find each other. Peers communicate with the host of the file information and the tracker using a simple protocol layered on top of HTTP. Each peer sends information about what file it is downloading, on what port it is listening, and other information. The tracker responds with a list of contact information for peers that are downloading the same file. However, the communication between a peer and a tracker requires much less bandwidth than a direct server-to-client file download.

In a typical P2P implementation, a file is divided into pieces of fixed size, e.g., 256 KB, also referred to as file fragments 332, 334, 336, 338, 340, 342. Each downloader reports to its peers what pieces it has. Also, each downloader, at some point, uploads file pieces, also referred to as segments or fragments, to its peers. Whenever, a downloader finishes downloading a file fragment, the P2P client software performs a hash of the file fragment and compares the hash to an expected hash value, received in the file information, to determine if the file fragment downloaded correctly and has not been corrupted. If the file fragment downloads correctly, then the client reports to its peers that it has the file fragment available for upload.

At least one peer must start with the whole file. This peer is referred to as a "seed." Eventually other peers will possess the whole file, or at least every file fragment will be found on at least one client. Some peers may leave the network before possessing the whole file, while others may remain in the network well after completing retrieval of the file. The goal is to balance downloading clients with uploading clients.

In a peer-to-peer network, a computing device may only function as a seed for a limited number of other computing devices (sometimes referred to as "downloaders") at a time. That limited number may be dynamic, meaning that if a computing device is also performing other functions, such as streaming video or being used to play a video game, then the computing device may only be able to function as a seed for just a few other computing devices, or possibly no other computing devices. In typical implementations of a peer-to-peer network, while a seed computing device is already servicing the maximum number of downloaders that it can, the seed computing device declines all new download requests that it receives. Further, in typical implementations of a peer-to-peer network, the computing device(s) that send download request(s) to potential seed(s) do not have any knowledge of whether the download request(s) will likely be declined or accepted. The above described embodiments may be used to improve performance of peer-to-peer networks by applying a seed protocol using seed ratio and comparison ratio parameters to assign different priority to each part/segment of a file.

Figure 4:
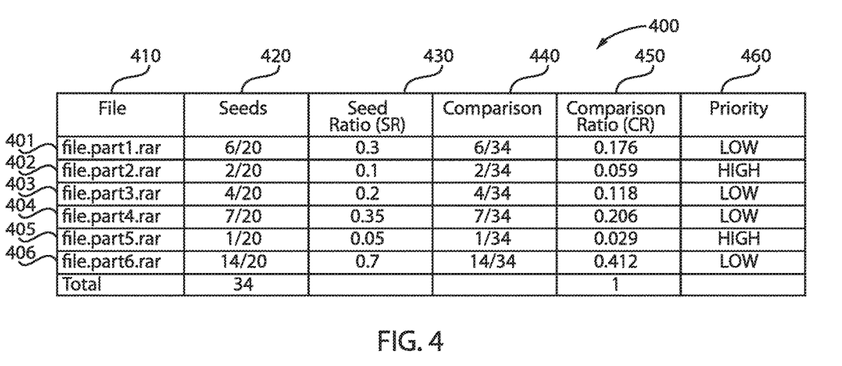
FIG. 4 is an example seed assurance protocol table illustrating file parts/segments satisfying a seed assurance rule, in accordance with an embodiment of the present principles.

FIG. 4 is an example seed assurance protocol table illustrating file parts/segments satisfying a seed assurance rule, in accordance with an embodiment of the present principles.

The seed assurance protocol table 400 includes, e.g., a "file" column 410, a "seeds" column 420, a "seed ratio" or SR column 430, a "comparison" column 440, a "comparison ratio" or CR column 450, and a "priority" column 460. The file of the "file" column 410 is composed of, e.g., 6 parts or segments 401, 402, 403, 404, 405, 406. The number of seeds that have a complete copy of the first file part 401 is six (6). There are a total of 20 peers who are still downloading or have already downloaded the first file part 401. Therefore, the seed ratio (SR) is 6/20 or 0.3 or 30%. The "comparison" column 440 indicates 6/34 for the first file part 401. The "6" represents the total number of seeds for the first file part 401 and the "34" represents the total number of seeds for all the file parts 401, 402, 403, 404, 405, 406 of the file. The first file part 401 has 6 seeds, the second file part 402 has 2 seeds, the third file part 403 has 4 seeds, the fourth file part 404 has 7 seeds, the fifth file part 405 has 1 seed, and the sixth file part 406 has 14 seeds. Thus, the total number of seeds is "34." Therefore, the comparison ratio (CR) is 0.176 for the first file part 401 or 17.6%. The CR ratio for the second file part 402 is 0.059 or 5.9%. The CR ratio for the third file part 403 is 0.118 or 11.8%. The CR ratio for the fourth file part 404 is 0.206 or 20.6%. The CR ratio for the fifth file part 405 is 0.029 or 2.9%. The CR ratio for the sixth file part 406 is 0.412 or 41.2%.

Therefore, the priority of each file part or segment may be based on the computed SR and CR ratios. In one example, the seed assurance protocol may be set such that the SR is less than or equal to 0.2 and the CR is less than or equal to 0.1. In other words, if the SR≤20% and the CR≤10%, then the priority of the file part is set to "HIGH."

For example, the second file part 402 has a SR=10% and a CR=5%. Therefore, the second file part 402 is set to a "HIGH" priority. In other words, since the second file part 402 has few seeds, the second file part 402 is prioritized for download. The less users or seeders that have a complete copy of a file part, the higher the priority of that file part (meaning that such file part is promoted or made more desirable for downloading and/or uploading).

Similarly, the fifth file part 405 has a SR=5% and a CR=2.9%. Therefore, the fifth file part 405 is set to a "HIGH" priority. In other words, since the fifth file part 405 has few seeds, the fifth file part 405 is prioritized for download. These are not only the download priorities for users/peers that have not completed the file, but also the upload priorities for users/peers that have completed the file. Further, the rest of the file parts do not meet the requirement of SR≤20% and the CR≤10%, thus resulting in a "LOW" priority designation. Of course, one skilled in the art may contemplate other thresholds for the SR and CR. For example, the SR may be set to 15% and the CR may be set to 7%. The SR may range anywhere between, e.g., 1% and 50%. Similarly, the CR may range anywhere between, e.g., 1% and 50%. Of course, it is contemplated that the SR and CR ratios may be equal to each other. For instance, both the SR and CR ratios may be set to 5% or 10% or 15% or 20%, etc.

Figure 5:
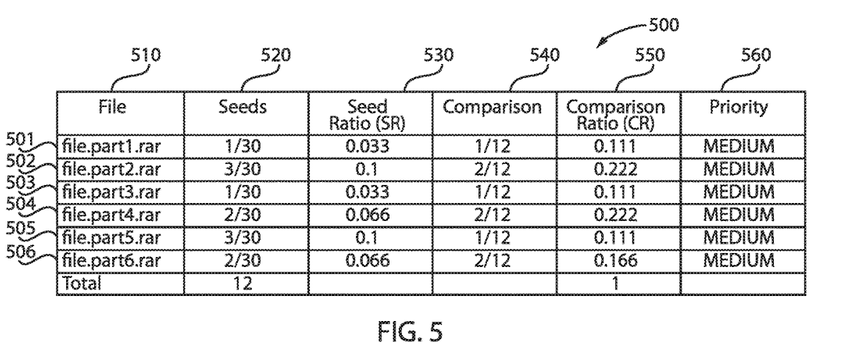
FIG. 5 is an example seed assurance protocol table illustrating file parts/segments satisfying the seed ratio component of the seed assurance rule, in accordance with an embodiment of the present principles.

FIG. 5 is an example seed assurance protocol table illustrating file parts/segments satisfying the seed ratio component of the seed assurance rule, in accordance with an embodiment of the present principles.

The seed assurance protocol table 500 includes, e.g., a "file" column 510, a "seeds" column 520, a "seed ratio" or SR column 530, a "comparison" column 540, a "comparison ratio" or CR column 550, and a "priority" column 560. The file of the "file" column 510 is composed of, e.g., 6 parts or segments 501, 502, 503, 504, 505, 506. The number of seeds that have a complete copy of the first file part 501 is one (1). There are a total of 30 peers who are still downloading or have already downloaded the first file part 501. Therefore, the seed ratio (SR) is 1/30 or 0.033 or 3.3%. The "comparison" column 540 indicates 1/12 for the first file part 501. The "1" represents the total number of seeds for the first file part 501 and the "12" represents the total number of seeds for all the file parts 501, 502, 503, 504, 505, 506 of the file. The first file part 501 has 1 seed, the second file part 502 has 3 seeds, the third file part 503 has 1 seed, the fourth file part 504 has 2 seeds, the fifth file part 505 has 3 seeds, and the sixth file part 506 has 2 seeds. Thus, the total number of seeds is "12." Therefore, the comparison ratio (CR) is 0.111 for the first file part 501 or 11.1%. The CR ratio for the second file part 502 is 0.222 or 22.2%. The CR ratio for the third file part 503 is 0.111 or 11.1%. The CR ratio for the fourth file part 504 is 0.222 or 22.2%. The CR ratio for the fifth file part 505 is 0.111 or 11.1%. The CR ratio for the sixth file part 506 is 0.166 or 16.6%.

Therefore, the priority of each file part or segment may be based on the computed SR and CR ratios. In one example, the seed assurance protocol may be set such that the SR is less than or equal to 0.2 and the CR is less than or equal to 0.1. In other words, if the SR≤20% and the CR≤10%, then the priority of the file part is set to "HIGH." If the SR≥20% and the CR≥10%, then the priority of the file part is set to "LOW." However, there may be scenarios where either the SR or the CR requirements are not met.

For example, the first file part 501 has a SR=3.3% and a CR=11.1%. Therefore, the first file part 501 is set to a "MEDIUM" priority. The SR requirement is met (SR≤20%). However, the CR requirement is not met (CR≥10%). Such situations or scenarios indicate that although there are few seeds for a file part, it is also likely that there are few seeds for other file parts too. Similarly, the second, third, fourth, and fifth file parts 502, 503, 504, 505, 506 each have an SR≤20% (thus meeting the first requirement or threshold) and each have a CR≥10% (thus not meeting the second requirement or threshold). As a result, each of the file parts 501, 502, 503, 504, 505, 506 is set to a "MEDIUM" priority.

Figure 6:
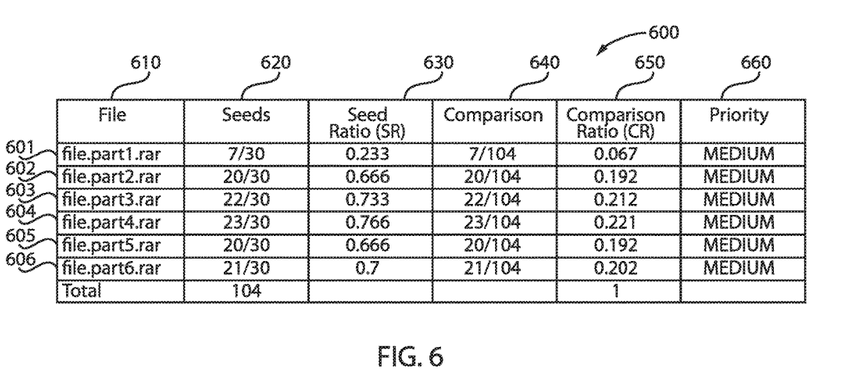
FIG. 6 is an example seed assurance protocol table illustrating file parts/segments satisfying the comparison ratio component of the seed assurance rule, in accordance with an embodiment of the present principles.

FIG. 6 is an example seed assurance protocol table illustrating file parts/segments satisfying the comparison ratio component of the seed assurance rule, in accordance with an embodiment of the present principles.

The seed assurance protocol table 600 includes, e.g., a "file" column 610, a "seeds" column 620, a "seed ratio" or SR column 630, a "comparison" column 640, a "comparison ratio" or CR column 650, and a "priority" column 660. The file of the "file" column 610 is composed of, e.g., 6 parts or segments 601, 602, 603, 604, 605, 606. The number of seeds that have a complete copy of the first file part 601 is seven (7). There are a total of 30 peers who are still downloading or have already downloaded the first file part 601. Therefore, the seed ratio (SR) is 7/30 or 0.233 or 23.3%. The "comparison" column 640 indicates 7/104 for the first file part 601. The "7" represents the total number of seeds for the first file part 601 and the "104" represents the total number of seeds for all the file parts 601, 602, 603, 604, 605, 606 of the file. The first file part 601 has 7 seeds, the second file part 602 has 20 seeds, the third file part 603 has 22 seeds, the fourth file part 604 has 23 seeds, the fifth file part 605 has 20 seeds, and the sixth file part 606 has 21 seeds. Thus, the total number of seeds is "104." Therefore, the comparison ratio (CR) is 0.067 for the first file part 601 or 6.7%. The CR ratio for the second file part 602 is 0.192 or 19.2%. The CR ratio for the third file part 603 is 0.212 or 21.2%. The CR ratio for the fourth file part 604 is 0.221 or 22.1%. The CR ratio for the fifth file part 605 is 0.192 or 19.2%. The CR ratio for the sixth file part 606 is 0.202 or 20.2%.

Therefore, the priority of each file part or segment may be based on the computed SR and CR ratios. In one example, the seed assurance protocol may be set such that the SR is less than or equal to 0.2 and the CR is less than or equal to 0.1. In other words, if the SR≤20% and the CR≤10%, then the priority of the file part is set to "HIGH." If the SR≥20% and the CR≥10%, then the priority of the file part is set to "LOW." However, there may be scenarios where either the SR or the CR requirements are not met.

For example, the first file part 601 has a SR=23.3% and a CR=6.7%. Therefore, the first file part 501 is set to a "MEDIUM" priority. The SR requirement is not met (SR≥20%). However, the CR requirement is met (CR≤10%). Such situations or scenarios indicate that although there are few seeds for a file part, it is also likely that there are few seeds for other file parts too.

In contrast, the second part 602 has an SR≥20% (thus not meeting the first requirement or threshold) and a CR≥10% (thus not meeting the second requirement or threshold). As a result, the file part 602 is set to a "MEDIUM" priority since both requirements are not met. Similarly, the third, fourth, fifth, and sixth parts 603, 604, 605, 606 are also set to "MEDIUM" priority, as the SR≥20% for each file part and the CR≥10% for each file part. Such situations or scenarios indicate that although there are other file parts that have more seeds, there either are only limited peers or there should be enough seeds for the file part to be sustained.

Figure 7:
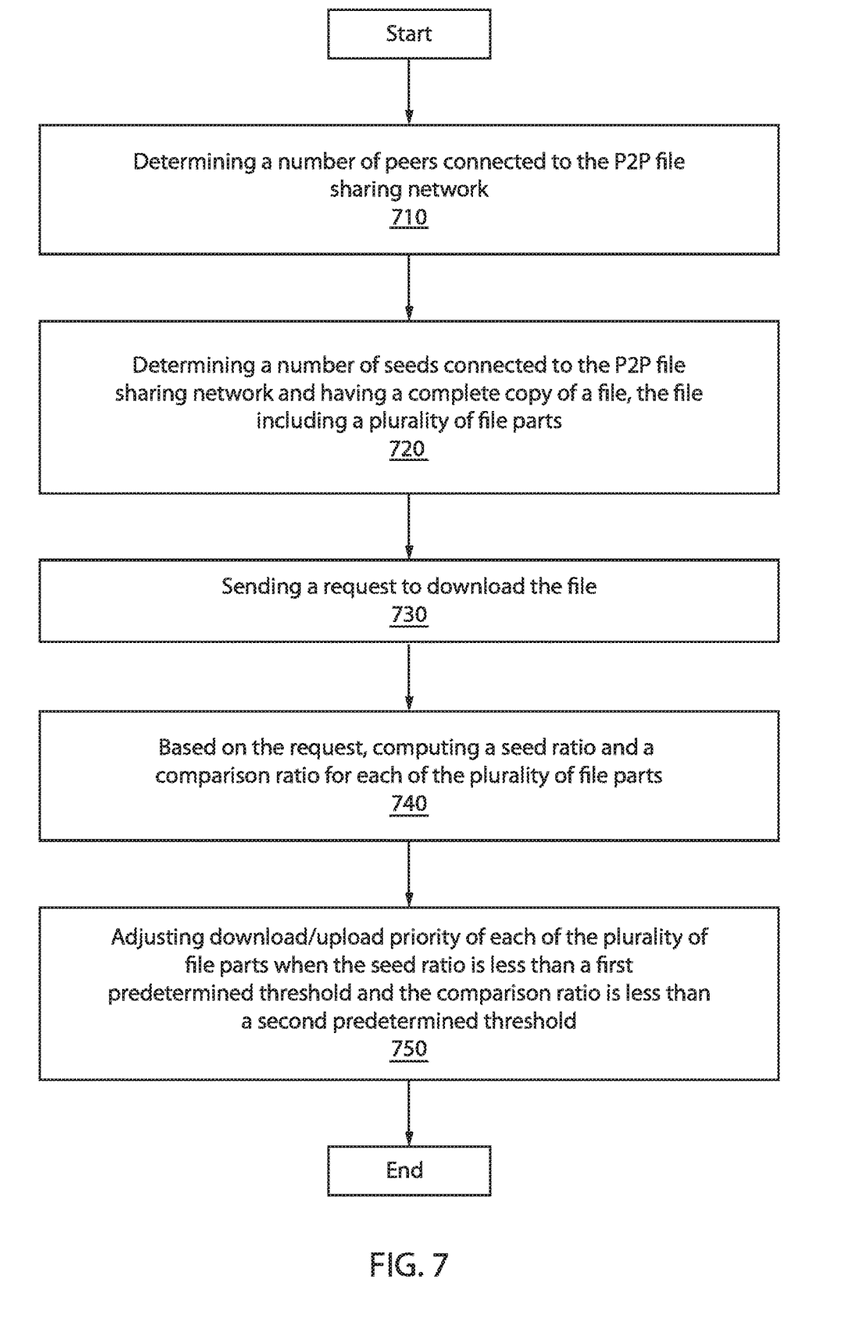
FIG. 7 is a block/flow diagram of an exemplary method for executing the P2P protocol, in accordance with an embodiment of the present principles.

FIG. 7 is a block/flow diagram of an exemplary method for executing the P2P protocol, in accordance with an embodiment of the present principles.

At block 710, a number of peers connected to the P2P file sharing network is determined.

At block 720, a number of seeds connected to the P2P file sharing network and having a complete copy of a file is determined, the file including a plurality of file parts.

At block 730, a request to download the file is sent, by e.g., a peer.

At block 740, based on the request, a seed ratio and a comparison ratio is computed for each of the plurality of file parts.

At block 750, download/upload priority of each of the plurality of file parts is adjusted when the seed ratio is less than a first predetermined threshold and the comparison ratio is less than a second predetermined threshold.

Figure 8:
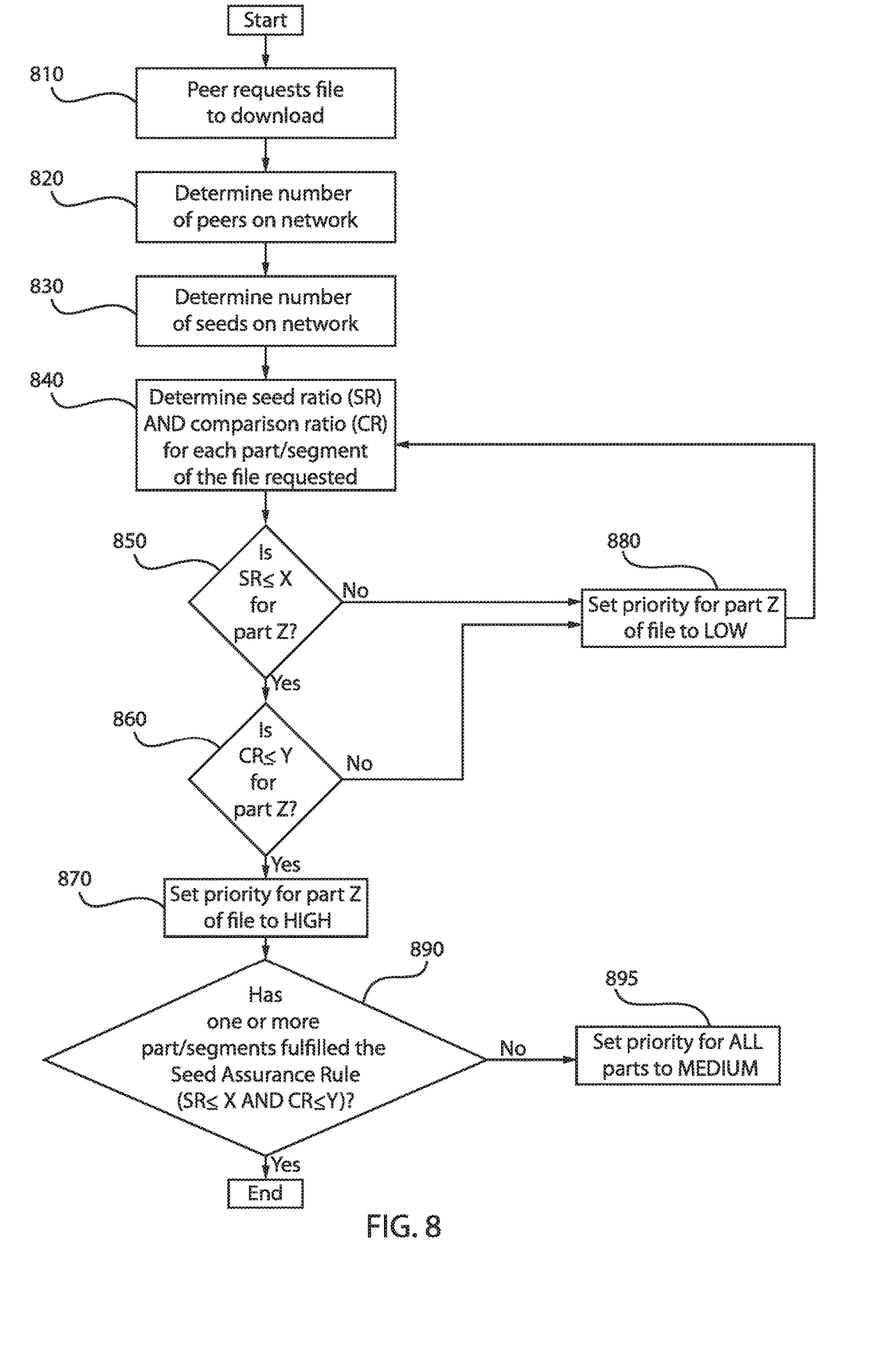
FIG. 8 is a block/flow diagram of an exemplary method for setting priorities to each part/segment of a file requested by a peer, in accordance with an embodiment of the present principles.

FIG. 8 is a block/flow diagram of an exemplary method for setting priorities to each part/segment of a file requested by a peer, in accordance with an embodiment of the present principles.

At block 810, a peer requests to download a file shared on a P2P file sharing network.

At block 820, the number of peers on the file sharing network is determined.

At block 830, the number of seeds on the file sharing network is determined.

At block 840, the seed ratio (SR) and the comparison ratio (CR) are determined for each part/segment of the requested file.

At block 850, it is determined whether SR is less than or equal to a first predetermined threshold (X). If YES, the process proceeds to block 860. If NO, the process proceeds to block 880 where the priority for part "Z" is set to "LOW."

At block 860, it is determined whether the comparison ratio (CR) is less than or equal to a second predetermined threshold (Y). If YES, the process proceeds to step 870 where the part "Z" of the file is set to "HIGH" priority. If NO, the process proceeds to step 880 where the part "Z" of the file is set to "LOW" priority.

At block 890, it is determined if any of the parts/segments fulfilled the SA rule (SR≤X and CR≤Y). If YES, the process ends. If NO, the process proceeds to block 895 where all the parts of the file are set to a "MEDIUM" priority.

Therefore, if SR≤X and CR≤Y, then the priority of the examined part of the file is set to a "HIGH" priority. However, if SR≤X and CR>Y, or, if SR>X and CR≤Y, then all the parts of the file are set to a "MEDIUM" priority. Moreover, if SR>X and CR>Y, then the priority of the examined part of the file is set to a "LOW" priority.

Therefore, if at least one file meets the seed assurance (SA) rule, then all the files that do not meet the SA rule have a "LOW" priority. If no files match the SA rule, all files have a "MEDIUM" priority assigned thereto.

In one or more embodiments, there may be more than 3 priority designations. In one or more embodiments, the priority may be numerically designated on a scale of, e.g., 1 to 5 or a scale of, e.g., 1 to 10. For example, one or more of the file parts may have a more important level of "HIGH" priority than the others. Thus, if three file parts are designated as "HIGH," one may be set to "1," another to "2," and another to "3." All file parts are "HIGH," however, the "HIGH" priority file parts may be further distinguished therebetween by numerical designations to create another level of priority. Thus, different weights may be given to different "HIGH" file parts. Similarly, different weights may be given to different "LOW" or "MEDIUM" file parts.

Figure 9:
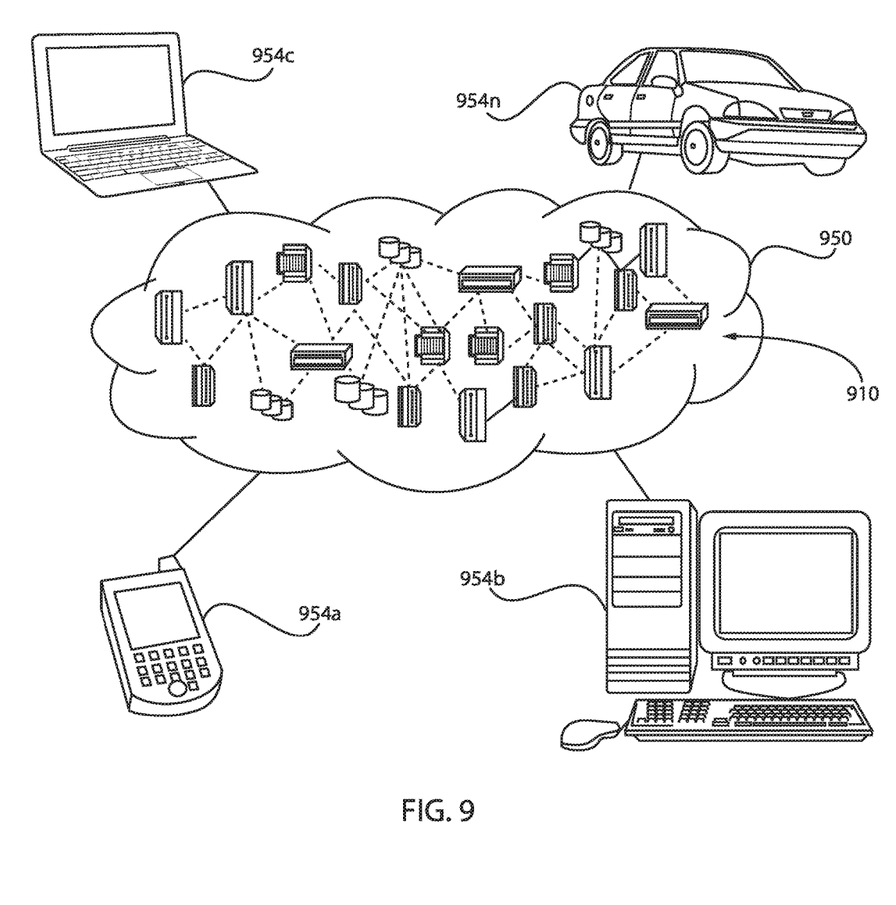
FIG. 9 is a block/flow diagram of an exemplary cloud computing environment, in accordance with an embodiment of the present principles.

FIG. 9 is a block/flow diagram of an exemplary cloud computing environment, in accordance with an embodiment of the present principles.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 9, illustrative cloud computing environment 950 is depicted for using a peer-to-peer seed assurance protocol. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. The network may be, e.g., a social network. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
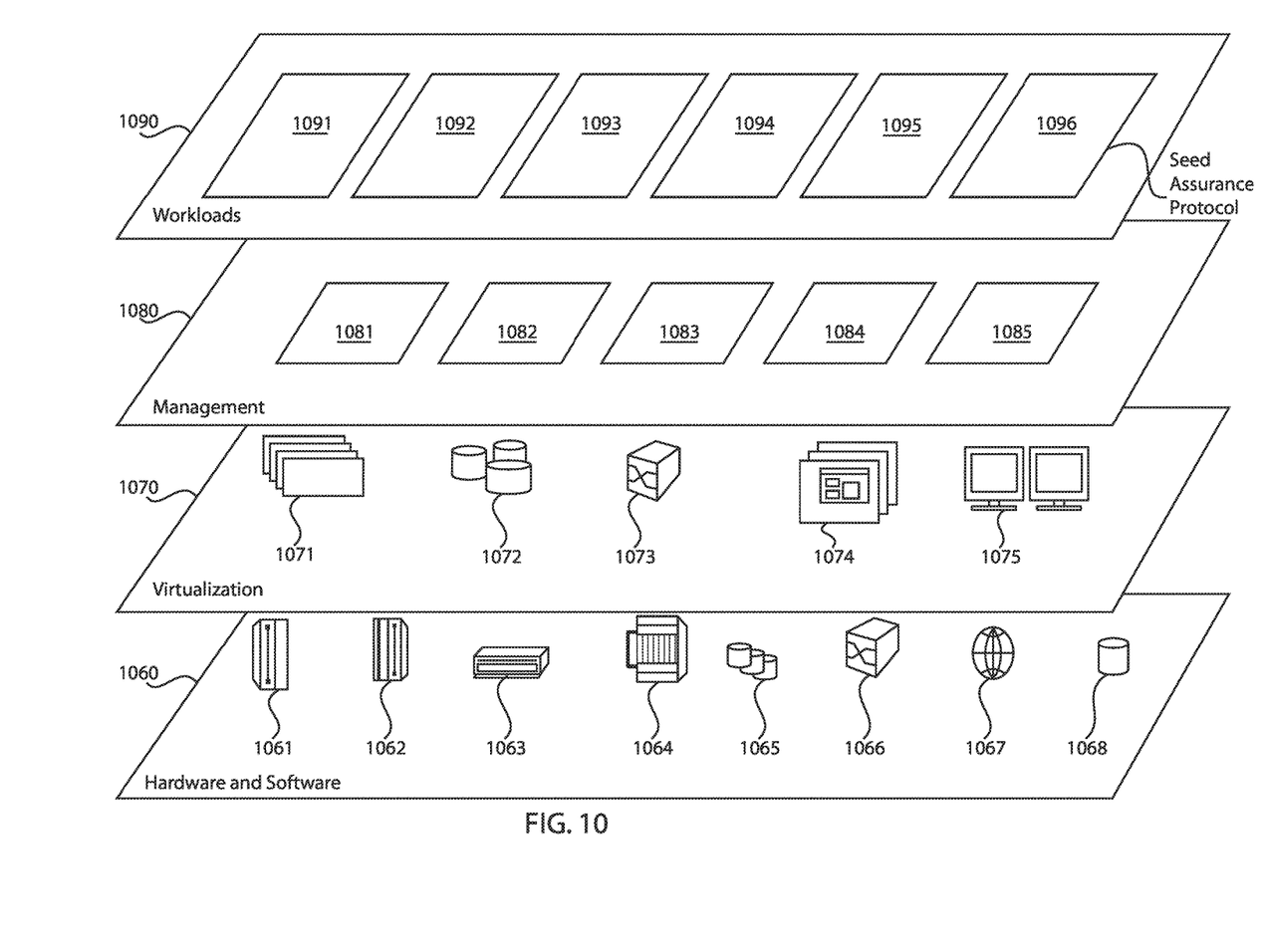
FIG. 10 is a schematic diagram of exemplary abstraction model layers, in accordance with an embodiment of the present principles.

FIG. 10 is a schematic diagram of exemplary abstraction model layers, in accordance with an embodiment of the present principles. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and P2P seed assurance protocol 1096.

Still yet, any of the components of the present invention could be created, integrated, hosted, maintained, deployed, managed, serviced, etc. by a service supplier who offers to provide a method for executing a P2P protocol. Thus, the present invention discloses a process for deploying, creating, integrating, hosting, maintaining, and/or integrating computing infrastructure, including integrating computer-readable code into the P2P protocol computer system 100 (FIG. 1), wherein the code in combination with the P2P protocol computer system 100 is capable of performing a method for providing a method for executing a P2P protocol with respect to a product or service. In another embodiment, the invention provides a business method that performs the process steps/blocks of the invention on a subscription, advertising, and/or fee basis. That is, a service supplier, such as a Solution Integrator, could offer to provide a method for executing a P2P protocol with respect to a product or service. In this case, the service supplier can create, maintain, support, etc. a computer infrastructure that performs the process steps/blocks of the invention for one or more customers. In return, the service supplier can receive payment from the customer(s) under a subscription and/or fee agreement and/or the service supplier can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims:

The invention claimed is:

1. A computer-implemented method executed on a peer-to-peer (P2P) file sharing network having at least one processor for executing a P2P protocol, the method comprising:
    determining a number of peers connected to the P2P file sharing network;
    determining a number of seeds connected to the P2P file sharing network and having a complete copy of a file, the file including a plurality of file parts;
    sending a request to download the file;
    based on the request, computing a seed ratio and a comparison ratio for each of the plurality of file parts; and
    adjusting download/upload priority of each of the plurality of file parts when the seed ratio is less than a first predetermined threshold and the comparison ratio is less than a second predetermined threshold.

2. The method of claim 1, wherein the seed ratio is a ratio of seeds having a copy of a file part of the plurality of file parts to a total number of peers downloading the file part.

3. The method of claim 1, wherein the comparison ratio is a ratio of seeds having a copy of a file part to a total number of seeds for all file parts of the file.

4. The method of claim 1, wherein the first predetermined ratio is different than the second predetermined ratio.

5. The method of claim 1, wherein the seed ratio and the comparison ratio indicate download priorities for peers connected to the P2P file sharing network that have not completed downloading the file.

6. The method of claim 1, wherein the seed ratio and the comparison ratio indicate upload priorities for peers connected to the P2P file sharing network that have completed downloading the file.

7. The method of claim 1, further comprising assigning downloading priority to file parts having the least number of seeds relative to the number of peers connected to the P2P file sharing network.

8. The method of claim 1, further comprising assigning downloading priority to file parts having the least number of seeds relative to the other file parts of the file.

9. The method of claim 1, further comprising promoting downloading/uploading of one or more file parts of the file that a small ratio of peers connected to the P2P file sharing network have completed.

10. A computer readable storage medium comprising a computer readable program for executing a peer-to-peer (P2P) protocol, wherein the computer readable program when executed on a computer causes the computer to perform the steps of:
    determining a number of peers connected to the P2P file sharing network;
    determining a number of seeds connected to the P2P file sharing network and having a complete copy of a file, the file including a plurality of file parts;
    sending a request to download the file;
    based on the request, computing a seed ratio and a comparison ratio for each of the plurality of file parts; and
    adjusting download/upload priority of each of the plurality of file parts when the seed ratio is less than a first predetermined threshold and the comparison ratio is less than a second predetermined threshold.

11. The computer readable storage medium of claim 10, wherein the seed ratio is a ratio of seeds having a copy of a file part of the plurality of file parts to a total number of peers downloading the file part.

12. The computer readable storage medium of claim 10, wherein the comparison ratio is a ratio of seeds having a copy of a file part to a total number of seeds for all file parts of the file.

13. The computer readable storage medium of claim 10, wherein the first predetermined ratio is different than the second predetermined ratio.

14. The computer readable storage medium of claim 10, wherein the seed ratio and the comparison ratio indicate download priorities for peers connected to the P2P file sharing network that have not completed downloading the file.

15. The computer readable storage medium of claim 10, wherein the seed ratio and the comparison ratio indicate upload priorities for peers connected to the P2P file sharing network that have completed downloading the file.

16. The computer readable storage medium of claim 10, wherein the method comprises assigning downloading priority to file parts having the least number of seeds relative to the number of peers connected to the P2P file sharing network.

17. The computer readable storage medium of claim 10, wherein the method comprises assigning downloading priority to file parts having the least number of seeds relative to the other file parts of the file.

18. The computer readable storage medium of claim 10, wherein the method comprises promoting downloading/uploading of one or more file parts of the file that a small ratio of peers connected to the P2P file sharing network have completed.

19. A computer system for executing a peer-to-peer (P2P) protocol, the computer system comprising:
    a memory; and
    a processor in communication with the memory, wherein the processor is configured to:
        determine a number of peers connected to the P2P file sharing network;
        determine a number of seeds connected to the P2P file sharing network and having a complete copy of a file, the file including a plurality of file parts;
        send a request to download the file;
        based on the request, compute a seed ratio and a comparison ratio for each of the plurality of file parts; and
        adjust download/upload priority of each of the plurality of file parts when the seed ratio is less than a first predetermined threshold and the comparison ratio is less than a second predetermined threshold.

20. The computer system of claim 19, wherein downloading priority is assigned to file parts having the least number of seeds relative to (i) the number of peers connected to the P2P file sharing network and (ii) the other file parts of the file.

* * * * *